(12) United States Patent
Zhang et al.

(10) Patent No.: US 9,973,347 B2
(45) Date of Patent: *May 15, 2018

(54) PROTOCOL CONVERTER BETWEEN CPCI BUS AND ISA BUS AND CONVERSION METHOD THEREOF

(71) Applicant: CRRC QINGDAO SIFANG ROLLING STOCK RESEARCH INSTITUTE CO., LTD., Qingdao (CN)

(72) Inventors: Yawei Zhang, Qingdao (CN); Mengxiang Zhu, Qingdao (CN); Jiaomei Qin, Qingdao (CN); Shuang Wang, Qingdao (CN)

(73) Assignee: CRRC QINGDAO SIFANG ROLLING ROCK RESEARCH INSTITUTE CO., LTD, Shandong (CN)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/390,287

(22) Filed: Dec. 23, 2016

(65) Prior Publication Data

US 2017/0111184 A1    Apr. 20, 2017

Related U.S. Application Data

(63) Continuation of application No. PCT/CN2015/079334, filed on May 20, 2015.

(30) Foreign Application Priority Data

Feb. 5, 2015    (CN) .......................... 2015 1 0062421

(51) Int. Cl.
*H04L 12/40* (2006.01)
*G06F 13/38* (2006.01)
*G06F 13/42* (2006.01)

(52) U.S. Cl.
CPC ........ *H04L 12/40169* (2013.01); *G06F 13/38* (2013.01); *G06F 13/42* (2013.01); *H04L 2012/40293* (2013.01)

(58) Field of Classification Search
None
See application file for complete search history.

(56) References Cited

U.S. PATENT DOCUMENTS 6,714,990 B1 *  3/2004  Autio .................. G06F 3/038
                                                 709/250
7,174,390 B2 *  2/2007  Schulter .............. H04L 12/28
                                                 709/238

(Continued)

FOREIGN PATENT DOCUMENTS

CN    101963948 A    2/2011
CN    102411553 A    4/2012

(Continued)

OTHER PUBLICATIONS

Hou, Jinbiao, "Study on PCI Bus and ISA Bus Conversion Deign" Computer Applications and Software; vol. 30, No. 8; (Aug. 2013); pp. 236-241.

(Continued)

*Primary Examiner* — Bunjob Jaroenchonwanit
(74) *Attorney, Agent, or Firm* — J.C. Patents

(57) ABSTRACT

The present application relates to the technical field of field bus communication, and in particular to a protocol converter between a CPCI bus and an ISA bus and a conversion method thereof, which are suitable for communication between railway vehicle CPUs and vehicle bus MVB devices. The protocol converter comprises a CPCI local bus interface extension timing module, an ISA bus interface timing module, a CPCI bus matching ISA bus timing interface module, and a clock management module. The CPCI bus realizes communication with the ISA bus by the protocol (Continued)

converter. The traditional conversion bridge chips are replaced with the protocol converters without changing the traction controller structure and other devices in the system; the flexibility is high; and the functions are diverse. In addition, 8-bit data width or 16-bit data width of the ISA bus is supported, and the operation of an ISA bus device by a CPCI bus device in the form of IO or in the form of MEMORY is supported.

5 Claims, 3 Drawing Sheets

(56) References Cited

U.S. PATENT DOCUMENTS

| | | | | |
|---|---|---|---|---|
| 7,398,293 | B2* | 7/2008 | Ramsey | H04N 21/226 348/E5.008 |
| 7,401,126 | B2* | 7/2008 | Pekkala | H04L 49/103 709/217 |
| 8,576,758 | B2* | 11/2013 | He | H04L 12/12 370/311 |
| 8,691,065 | B2* | 4/2014 | Gau | G01N 27/286 204/406 |
| 8,996,210 | B2* | 3/2015 | Kish | G05B 23/0213 701/21 |
| 9,106,400 | B2* | 8/2015 | Cheng | H04L 7/0335 |
| 9,669,732 | B2* | 6/2017 | Cui | B60L 15/32 |
| 2003/0056049 | A1* | 3/2003 | Kaku | G06F 13/409 710/300 |
| 2003/0185231 | A1* | 10/2003 | Dobler | H04L 12/6418 370/465 |
| 2006/0004912 | A1* | 1/2006 | Najam | H04L 49/103 709/213 |
| 2006/0080492 | A1 | 4/2006 | Choi et al. | 710/315 |
| 2013/0263247 | A1* | 10/2013 | Jungck | H04L 29/12066 726/13 |
| 2014/0098662 | A1* | 4/2014 | Jungck | H04L 29/12066 370/230 |
| 2017/0111184 | A1* | 4/2017 | Zhang | H04L 12/40169 |
| 2017/0129364 | A1* | 5/2017 | Cui | B60L 15/32 |

FOREIGN PATENT DOCUMENTS

| | | |
|---|---|---|
| CN | 102929756 A | 2/2013 |
| CN | 103530256 A | 1/2014 |
| CN | 104020691 A | 9/2014 |
| CN | 104579885 A | 4/2015 |
| JP | 2002-198990 A | 7/2002 |
| JP | 2003-122458 A | 4/2003 |
| JP | 2006-502601 A | 1/2006 |

OTHER PUBLICATIONS

International Search Report of corresponding International PCT Application No. PCT/CN2015/079334, dated Nov. 11, 2015.
Chinese First Examination Report of corresponding China patent Application No. 201510062421.1, dated Dec. 3, 2015.
The extended European Search Report of corresponding European patent application No. 15880840.2, dated Feb. 23, 2017.
The Japanese Notification of Reasons of Rejection of corresponding Japan patent application No. 2017-502873, dated Nov. 14, 2017.
The Decision to Grant a Patent for the Invention of corresponding Russia Federation patent application No. 2016141245/08(065973), dated Mar. 27, 2017.

* cited by examiner

PROTOCOL CONVERTER BETWEEN CPCI BUS AND ISA BUS AND CONVERSION METHOD THEREOF

CROSS-REFERENCE TO RELATED APPLICATIONS

This application is a continuation of International application No. PCT/CN2015/079334 filed on May 20, 2015, entitled Protocol Converter and conversion Method of CPCI Bus and ISA Bus, which claims the priority benefit of Chinese patent application No. 201510062421.1, filed on Feb. 5, 2015. The contents of the above-mentioned patent applications are incorporated by reference herein in their entirety and made a part of this specification.

TECHNICAL FIELD

The present invention relates to the technical field of field-bus communication, and in particular to a protocol converter between a CPCI bus and an ISA bus and conversion method thereof, which are suitable for communication between railway vehicle CPUs and vehicle bus MVB devices.

BACKGROUND

An ISA (Industrial Standard Architecture) bus is a bus standard formulated by the IBM Corporation for PCs. An ISA bus has a clock frequency of 8 MHz and a maximum data transmission rate of 16 M/S. The ISA bus is low in the transmission rate and takes up a large share of CPU resources. With development of bus technologies, the ISA bus is gradually replaced with the high-speed CPCI bus.

A CPCI (Compact Peripheral Component Interconnect) bus is a high-speed bus interface specification standard proposed by the International Industrial Computer Manufacturer's Group in the last century. Based on electrical interface specification of the standard PCI bus, the CPCI bus is a bus with high compatibility and high reliability; and the bus clock frequency thereof can reach 66 MHz.

The ISA buses are highly compatible. With years of technology accumulation, there is a large quantity of mature products of the ISA bus. Due to the hot-pluggable property, high compatibility, high reliability and high transmission rate, the CPCI buses have been widely applied in traction controllers of railway vehicles. However, ISA bus interfaces are still extensively applied in MVB communication devices of railway vehicles. To realize stable and reliable communication between a high-speed CPCI bus and a low-speed ISA bus, providing a bus converter between a CPCI bus and an ISA bus is a challenge which all railway vehicle development professionals face.

The key technology for designing a stable and reliable communication between a high-speed CPCI bus and a low-speed ISA bus is to design a local interface of the CPCI bus to match the ISA bus interface. At present, the most widespread implementation solution is to use dedicated bridge chips manufactured by PLX and AMCC for conversion to achieve communication between a CPCI bus device and an ISA bus device. With regard to the bus mode of a bridge chip, a standard ISA bus interface is provided, an ISA bus interface on the bridge chip is directly connected to an ISA bus interface on a device; an EEPROM (Electrically Erasable Programmable Read-only Memory) is used to store configuration information of the bridge chip; of course, a microcontroller is required to provide an ISA bus clock signal, and thus the address of the ISA bus, the control signal and the CPCI bus interface are matched. The hardware architecture of the specific implementation is shown in FIG. 1. With the architecture designed in this way, the development professionals gain an excuse for laziness, sparing the efforts to make in-depth understanding of CPCI interface specifications. This is disadvantageous for maintenance of the existing products and development of subsequent products. What is worse, a user is unable to control the CPCI bus timing according to his/her ideas, due to restrictions by hardware bridge chips. In addition, this increases burden for hardware designer. That is, an additional interface card for conversion from a CPCI bus to an ISA bus is designed, thus increasing the design cost; furthermore, only some conversion functions of the bridge chip are used by most users, thus leading to a large amount of resource waste.

BRIEF SUMMARY OF THE INVENTION

An objective of the present application is to provide a protocol converter between a CPCI bus and an ISA bus and a conversion method thereof, to solve the problem in the prior art that no direct communication between a CPCI bus on a CPU and an ISA bus on an MVB device can be realized.

The present application employs the following technical solutions.

Since communication between a main control unit CPU device and a control board in an existing train traction controller is performed by a standard CPCI bus, if real-time communication is to be performed between the main control unit CPU device and an MVB device having an ISA bus interface on the control board, in order to save the area of the board, improve the cost performance ratio and the design flexibility, a protocol converter between a CPCI bus and an ISA bus is designed. The protocol converter comprises a CPCI local bus interface extension timing module, an ISA bus interface timing module, a CPCI bus matching ISA bus timing interface module, and a clock management module.

The CPCI local bus interface extension timing module communicates with the local CPCI bus by an address/data signal AD [31:0], a command/byte enable signal C/BE [3:0], a slave device get-ready signal TRDY, a data transfer stop signal STOP, a frame period signal FRAME, and a master device get-ready signal IRDY;

the ISA bus interface timing module communicates with the CPCI local bus interface extension timing module by a data enable signal S_DATA_VLD, an address enable signal ADDR_VLD, a read enable signal barx_rd, a write enable signal barx_wr, a byte enable signal S_CBE, a data signal D [31:0] and an address signal A [31:0];

the ISA bus interface timing module communicates with the local ISA bus by a data signal SD, an address signal SA, a read/write IO device signal IOW/IOR, a read/write MEMORY device signal MEMR/MEMW, an address latch signal BALE;

the CPCI bus matching ISA bus timing interface module communicates with the CPCI local bus interface extension timing module by an interruption and reconnection signal USER_STOP; and the clock management module provides an operation clock for the CPCI local bus interface extension timing module, the ISA bus interface timing module and the CPCI bus matching ISA bus timing interface module.

Preferably, when the CPCI local bus interface extension timing module communicates with the local CPCI bus, and when the CPCI bus accesses in the form of IO, a waiting signal S_WAIT is inserted in the read/write operation of the CPCI bus to control the slave device get-ready signal TRDY of the CPCI bus.

Preferably, when the CPCI local bus interface extension timing module communicates with the local CPCI bus, and when the CPCI bus accesses in the form of MEMORY, a data transfer stop signal STOP is inserted in the read/write operation of the CPCI bus; and the data transfer stop signal STOP is interrupted by the interruption and reconnection signal USER_STOP.

Compared with prior art, the present application has the following beneficial effects:

1) convenient for operation: the protocol converter between a CPCI bus and an ISA bus is implemented on the basis of FPGA, and the traditional conversion bridge chips are replaced by the protocol converters without changing the traction controller structure and other devices in the system;

2) high in flexibility: the conversion timing between a CPCI bus and an ISA bus can be designed as needed to achieve different conversion functions; and 3) Diverse in functions: 8-bit data width or 16-bit data width of the ISA bus is supported, and the operation of an ISA bus device by a CPCI bus device in the form of IO or in the form of MEMORY is supported.

DETAILED DESCRIPTION

In order to make the objectives, technical solutions and advantages of the embodiments of the present application more clear, the technical solutions in the embodiments of the present application will be described clearly and completely with reference to the accompanying drawings. Obviously, the embodiments described are merely some but not all of the embodiments of the present application. On the basis of the embodiments of the present application, all other embodiments obtained by those skilled in the art without paying any creative effort shall fall into the protection scope of the present invention.

Embodiment 1

A protocol converter between a CPCI bus and an ISA bus is provided to achieve real-time communication between a main control device having a CPCI bus interface and an MVB device having an ISA bus interface. The protocol converter mainly consists of four modules, respectively: a CPCI local bus interface extension timing module, an ISA bus interface timing module, a CPCI bus matching ISA bus timing interface module, and a clock management module.

Figure 1:
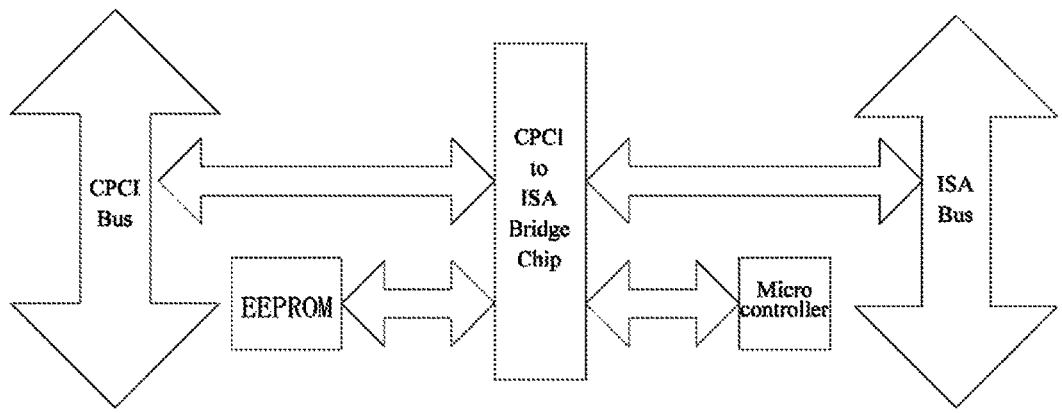
FIG. 1 is a schematic structure diagram of traditional communication between a CPCI bus and an ISA bus.
Figure 2:
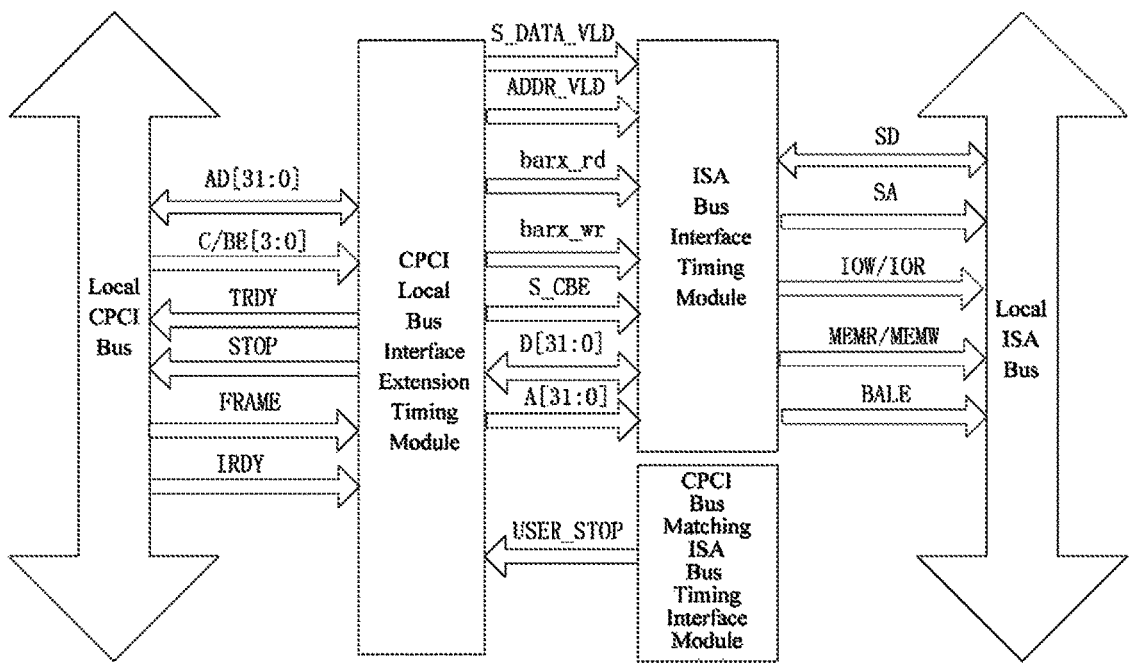
FIG. 2 is a schematic structure diagram of the protocol converter.

The CPCI local bus interface extension timing module is mainly used to configure an access space IO/MEMORY of the CPCI bus, control the read/write access of the CPCI bus, decode addresses and decode commands. An interface connection between the local CPCI bus and the CPCI local bus interface extension timing module is as shown in FIG. 2. Main signals between the two include: an address/data signal AD [31:0], a command/byte enable signal C/BE [3:0], a slave device get-ready signal TRDY, a data transfer stop signal STOP, a frame period signal FRAME, and a master device get-ready signal IRDY.

Figure 3:
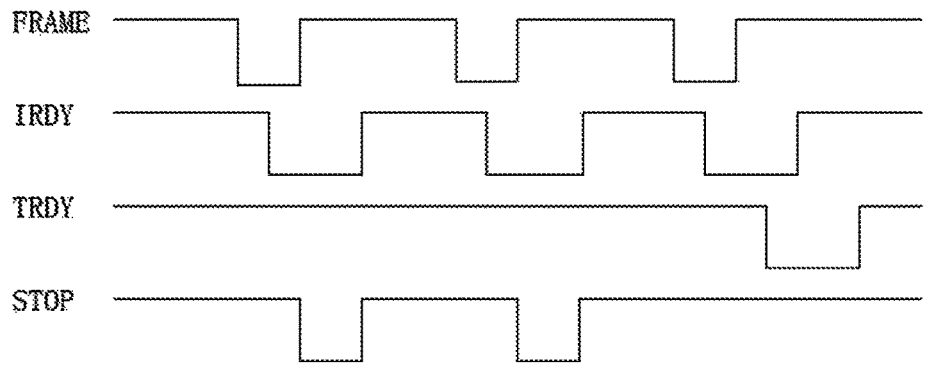
FIG. 3 is a specific timing chart of TRDY, STOP, FRAME and IRDY.

For the data transfer stop signal STOP, since the CPCI bus is a high-speed device while the ISA bus is a low-speed device, and the CPCI bus is quick in read/write operation so that the MVB device which is in direct communication with the CPCI bus can hardly make a response, high data packet loss is caused. When the CPCI bus accesses in the form of IO, a waiting signal S_WAIT is inserted in the read/write operation of the CPCI bus to control the slave device get-ready signal TRDY of the CPCI bus. When the CPCI bus accesses in the form of MEMORY, the data transfer stop signal STOP is inserted in the read/write operation of the CPCI bus; before the present operation of the MEMORY device ends, the CPCI bus is in the interruption and reconnection state all the time, so that the CPCI bus requests for the present read/write operation all the time; and the CPCI bus will initiate a next read/write access until no data transfer stop signal STOP is inserted in the previous operation. The data transfer stop signal STOP is sent by the slave device; when the data transfer stop signal STOP is valid, it is indicated that the slave device requests the master device to terminate the present data transfer. FIG. 3 is a specific timing diagram of the slave device get-ready signal TRDY, the data transfer stop signal STOP, the frame period signal FRAME and the master device get-ready signal IRDY.

An interface connection between the CPCI local bus interface extension timing module and the ISA bus interface timing module is as shown in FIG. 2. Main signals between the two include: a data enable signal S_DATA_VLD, an address enable signal ADDR_VLD, a read enable signal barx_rd, a write enable signal barx_wr, a byte enable signal S_CBE, a data signal D [31:0] and an address signal A [31:0].

An operating command from the CPCI bus is recognized by an IP CORE module from XILINX company to generate a read/write enable signal S_WRDN, an address enable signal ADDR_VLD, a data enable signal S_DATA_VLD, a byte enable signal S_CBE and a space decoding signal BASE_HIT.

For the data enable signal S_DATA-VLD, since the CPCI bus and the ISA bus are inconsistent in read/write speed, an intermediate data buffering region BUFFER is to be established. That is, when a write operation of the CPCI bus is going to happen, the CPCI bus data is written into the data buffering region BUFFER and then transferred to the ISA bus; and when a read operation of the CPCI bus is going to happen, the ISA bus data is transferred to the data buffering region BUFFER and then transferred to the CPCI bus.

The read enable signal barx_rd and the write enable signal barx_wr are obtained in the following way: in the present traction controllers, the MVB device, based on ISA buses, can be an IO device or an MEMORY device or both, because the operating ways of ISA buses supported by MVB devices from different manufactures are different, the access space of the CPCI bus should be configured according to actual requirements; then, a chip selection signal of an MVB device is determined according to the address signal and an address enable signal ADDR_VLD provided by the CPCI bus; then, the space IO/MEMORY of the present operation is determined by further considering the read/write enable signal S_WRDN and the space decoding signal BASE_HIT; and eventually, a read enable signal barx_rd and a write enable signal barx_wr actually used are obtained. Wherein, x in the read enable signal barx_rd represents a selected space, x=0, 1 or 2; and x in the write enable signal barx_wr represents a selected space, x=0, 1 or 2.

An interface connection between the CPCI bus matching ISA bus timing interface module and the CPCI local bus interface extension timing module is as shown in FIG. 2. A main signal between the two is the interruption and reconnection signal USER_STOP which is mainly used to interrupt the data transfer stop signal STOP. The CPCI bus device initiates an access to the ISA bus device, and when accessing in the form of MEMORY, the CPCI bus matching ISA bus timing interface module sends an interruption and reconnection signal USER_STOP in real time to interrupt the data transfer stop signal STOP, in order to leave enough time for the ISA bus device to complete this read/write access. Thus, the problem that the CPCI bus and the ISA bus are inconsistent in read/write operation speed is solved.

An interface connection between the ISA bus interface timing module and the local ISA bus is as shown in FIG. 2. Main signals between the two include: a data signal SD, an address signal SA, a read/write IO device signal IOW/IOR, a read/write MEMORY device signal MEMR/MEMW, and an address latch signal BALE.

The clock management module provides an operation clock for the CPCI local interface extension timing module, the ISA bus interface timing module and the CPCI bus matching ISA bus timing interface module by an FPGA interior clock network and a phase-locked loop.

Figure 4:
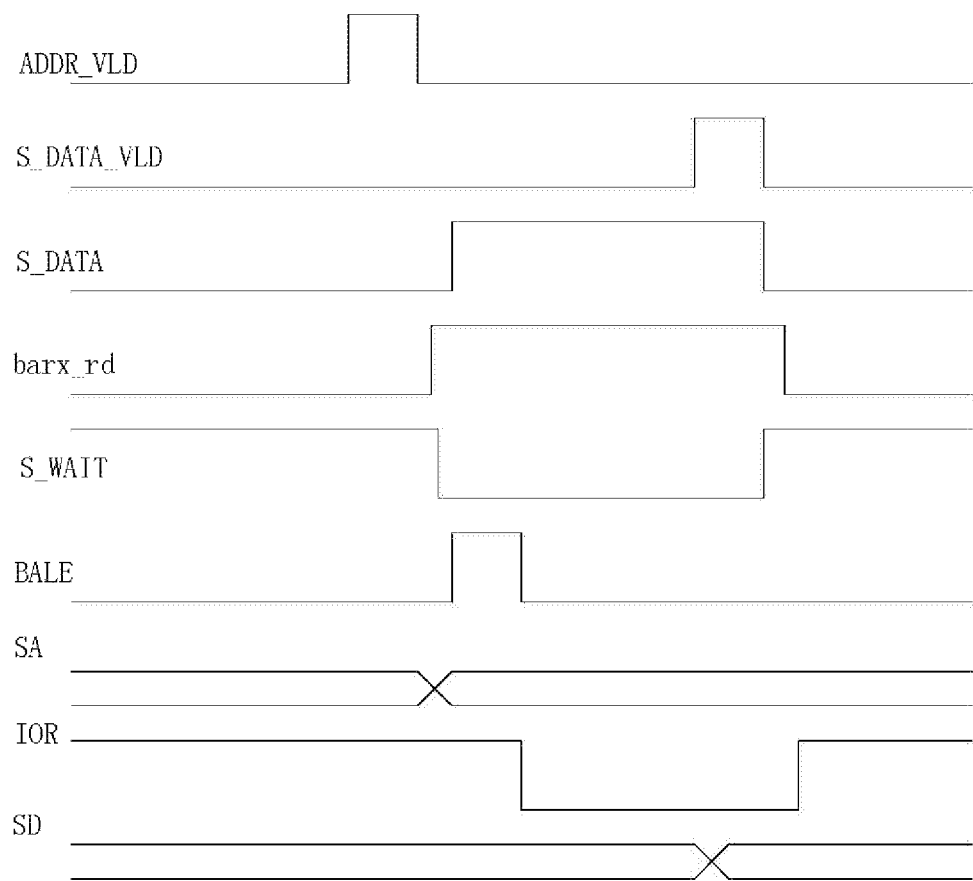
FIG. 4 is partial timing chart of a read access in the form of IO by the protocol converter.

FIG. 4 is partial timing chart of a read access in the form of IO by the protocol converter.

Figure 5:
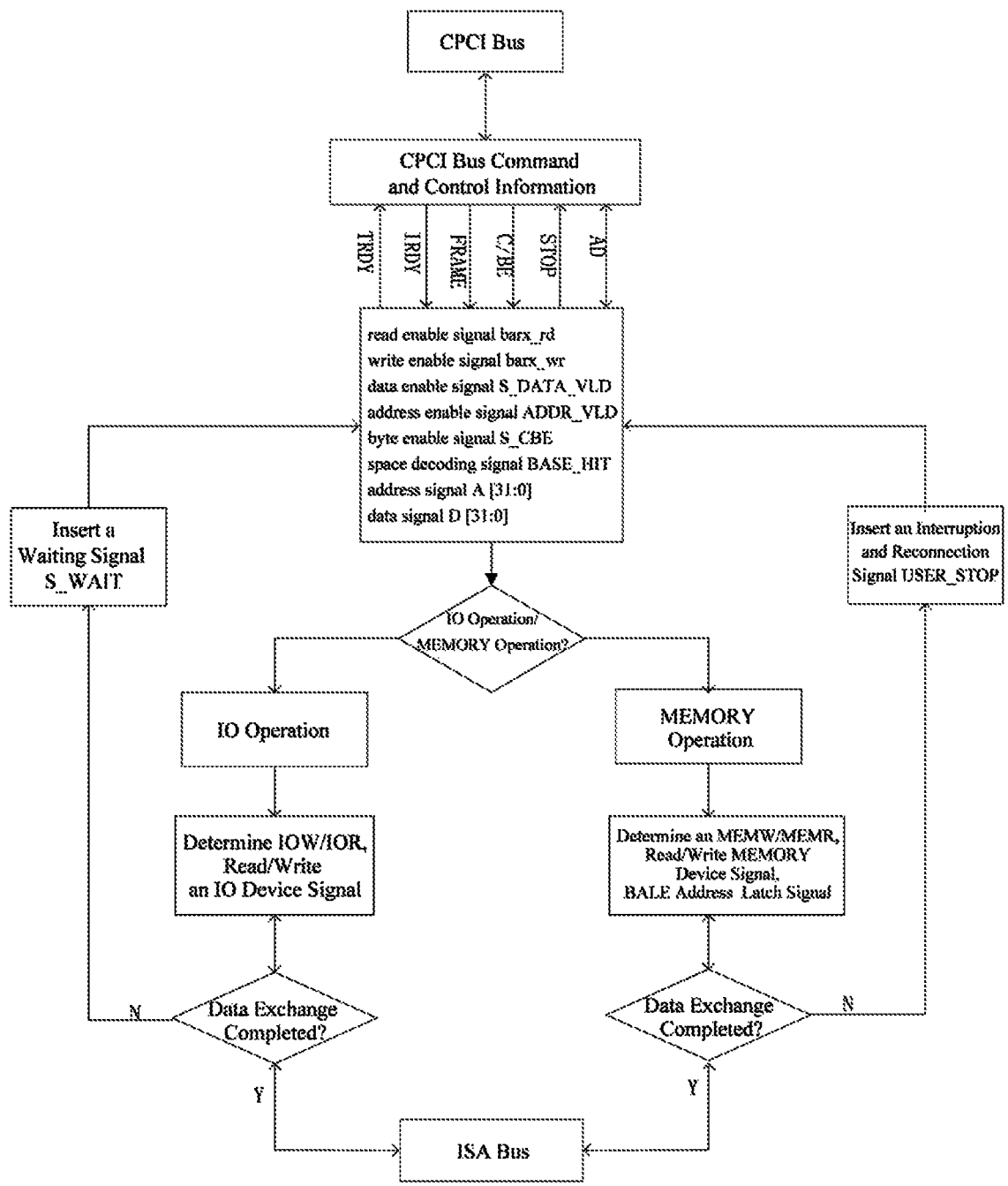
FIG. 5 is a flowchart of an access by the protocol converter.

FIG. 5 is a flowchart of an access by the protocol converter. The main control CPU device accesses to the MVB device with the ISA bus interface by the CPCI bus as follows:

1) an access space IO/MEMORY of the CPCI bus is determined, the data transfer stop signal STOP is inserted when the CPCI bus accesses in the form of MEMORY, and the waiting signal S_WAIT is inserted to wait for an ISA bus device to get ready when the CPCI bus accesses in the form of IO;

2) an actual address signal SA and an access mode for the CPCI bus to access to the ISA bus are determined by the address enable signal ADDR_VLD, the read enable signal barx_rd, the write enable signal barx_wr and the byte enable signal S_CBE, the access mode comprises the write operation and the read operation;

3) an address latch signal BALE of the ISA bus is determined;

4) byte data enabled in the 32-bit data is decided according to the byte enable signal S_CBE; and corresponding 8-bit data or 16-bit data is screened out from the intermediate data buffering region BUFFER for data interaction with an MVB device;

5) the read/write IO device signal IOW/IOR or the read/write MEMORY device signal MEMR/MEMW is determined according to the read/write signal pulse width specified by the ISA bus, and thus a main control CPU device accesses to the MVB device with the ISA bus interface by the CPCI bus in real time.

It can be understood by those skilled in the art that the accompanying drawings are merely schematic views of one preferred embodiment, and the flows in the accompanying drawings are not necessary for implementing the present invention.

Finally, it should be noted that the foregoing embodiments are merely used to describe the technical solutions of the present application, instead of limiting the present application. Although the present application has been described in detail with reference to the foregoing embodiments, it should be understood by those of ordinary skill in the art that modifications can be made to the technical solutions recorded in the foregoing embodiments, or that equivalent replacements can be made to some technical features. These modifications or replacements shall not make the essence of corresponding technical solutions depart from the scope of the technical solutions of the embodiments of the present application.

The invention claimed is:

1. A protocol converter between a CPCI bus and an ISA bus, characterized in that, the protocol converter comprises a FPGA chip which is configured to execute a CPCI local bus interface extension timing module, an ISA bus interface timing module, a CPCI bus matching ISA bus timing interface module, and a clock management module;

the CPCI local bus interface extension timing module communicates with the CPCI bus by an address/data signal AD [31:0], a command/byte enable signal C/BE [3:0], a slave device get-ready signal TRDY, a data transfer stop signal STOP, a frame period signal FRAME, and a master device get-ready signal IRDY;

the ISA bus interface timing module communicates with the CPCI local bus interface extension timing module by a data enable signal S_DATA_VLD, an address enable signal ADDR_VLD, a read enable signal barx_rd, a write enable signal barx_wr, a byte enable signal S_CBE, a data signal D [31:0] and an address signal A [31:0];

the ISA bus interface timing module communicates with the ISA bus by a data signal SD, an address signal SA, a read/write IO device signal IOW/IOR, a read/write MEMORY device signal MEMR/MEMW, an address latch signal BALE;

the CPCI bus matching ISA bus timing interface module communicates with the CPCI local bus interface extension timing module by an interruption and reconnection signal USER_STOP; and the clock management module provides an operation clock for the CPCI local bus interface extension timing module, the ISA bus interface timing module and the CPCI bus matching ISA bus timing interface module.

2. The protocol converter between the CPCI bus and the ISA bus according to claim 1, characterized in that, when the CPCI local bus interface extension timing module communicates with the CPCI bus, and when the CPCI bus accesses in the form of IO, a waiting signal S_WAIT is inserted in the read/write operation of the CPCI bus to control the slave device get-ready signal TRDY of the CPCI bus.

3. The protocol converter between the CPCI bus and the ISA bus according to claim 1, characterized in that, when the CPCI local bus interface extension timing module communicates with the CPCI bus, and when the CPCI bus accesses in the form of MEMORY, a data transfer stop signal STOP is inserted in the read/write operation of the CPCI bus; and the data transfer stop signal STOP is interrupted by the interruption and reconnection signal USER_STOP.

4. A protocol conversion method for the CPCI bus and the ISA bus according to claim 1, comprising the following steps:

1) determining an access space IO/MEMORY of the CPCI bus, inserting the data transfer stop signal STOP when the CPCI bus accesses in the form of MEMORY, and inserting the waiting signal S_WAIT to wait for the ISA bus to get ready when the CPCI bus accesses in the form of IO;
2) according to the address enable signal ADDR_VLD, the read enable signal barx_rd, the write enable signal barx_wr and the byte enable signal S_CBE, determining an actual address signal SA and an access mode for the CPCI bus to access the ISA bus, wherein the access mode comprises a write operation and a read operation;
3) determining an address latch signal BALE of the ISA bus;
4) deciding byte data enabled in the 32-bit data according to the byte enable signal S_CBE; and screening out corresponding 8-bit data or 16-bit data from an intermediate data buffering region BUFFER for data interaction with an MVB device;
5) determining the read/write IO device signal IOW/IOR or the read/write MEMORY device signal MEMR/MEMW according to the read/write signal pulse width specified by the ISA bus, and thus a main control CPU device accesses to the MVB device with the ISA bus interface by the CPCI bus in real time.

5. A protocol converter for communication between a CPCI bus and an ISA bus, comprising a processor and a memory, wherein the protocol converter is configured to:

1) determine an access space IO/MEMORY of the CPCI bus, and insert a data transfer stop signal STOP when the CPCI bus accesses in the form of MEMORY, or insert a waiting signal S_WAIT to wait for the ISA bus to get ready when the CPCI bus accesses in the form of IO;
2) according to an address enable signal ADDR_VLD, a read enable signal barx_rd, a write enable signal barx_wr and a byte enable signal S_CBE, determine an actual address signal SA and an access mode for the CPCI bus to access the ISA bus, wherein the access mode comprises a write operation and a read operation;
3) determine an address latch signal BALE of the ISA bus;
4) decide byte data enabled in 32-bit data according to the byte enable signal S_CBE; and screen out corresponding 8-bit data or 16-bit data from an intermediate data buffering region BUFFER for data interaction with an MVB device; and
5) determine a read/write IO device signal IOW/IOR or a read/write MEMORY device signal MEMR/MEMW according to a read/write signal pulse width specified by the ISA bus, and thus a main control CPU device accesses to the MVB device with the ISA bus interface by the CPCI bus in real time.

* * * * *